2,916,468

POLYVINYL ALCOHOL CONTAINING UREA-FORMALDEHYDE ADHESIVE AND METHOD OF PREPARING SAME

Albert P. Yundt, Southampton County, and Keith E. Bradway, Franklin, Va., assignors to Union Bag-Camp Paper Corporation, New York, N.Y., a corporation of Virginia No Drawing. Application March 20, 1957
Serial No. 647,211

5 Claims. (Cl. 260—29.6)

The present invention relates to improvements in a size or adhesive. More particularly it pertains to a size or adhesive based on poly(vinyl alcohol) and the method of producing the same.

In our copending application, Serial No. 589,884, we have disclosed and claimed a size or adhesive based on a modified starch and the method of making the same.

It is an object of this invention to provide a size or adhesive which is only slowly subject to gelation and increase of viscosity on aging.

It is a further object of this invention to provide a size or adhesive as aforesaid which can be used at reasonably low viscosity and which will cure to an insoluble condition.

It is a further object of this invention to provide a size or adhesive as aforesaid based on poly(vinyl alcohol) or its copolymers or both having a degree of combination with urea-formaldehyde compounds greater than heretofore possible.

Other objects of the invention will in part be obvious and will in part appear hereinafter.

The invention accordingly comprises the several steps, and the relation of one or more of such steps with respect to each of the others, and the composition possessing the characteristics, properties and relation of constituents, which are exemplified in the following detailed disclosure, and the scope of the invention will be indicated in the claims.

Poly(vinyl alcohol) and water soluble copolymers of vinyl alcohol plus other monomers are very effective adhesives, sizes, and finishing agents for paper, textiles, leather, and comparable materials. Their value arises largely from their excellent adhesive properties. The "backbone" of the vinyl group of polymers is quite flexible compared to that of the natural carbohydrates and their derivatives. Accordingly, they can nestle into more intimate contact with surfaces despite the submicroscopic irregularities normally present. Polar bonds between the adhesive and the adherend are thus facilitated. A principal defect of these adhesives for the purposes indicated is their susceptibility to softening and even removal by water. The practice of this invention attaches additional polar groups to the polymer chain in the form of short branches. This enhances its adhesion to some substances by permitting additional polar, and sometimes even chemical bonds with the adherend. Additionally, the material, after curing of the urea-formaldehyde portion of the polymer, is rendered quite resistant to the deleterious effects of water.

Poly(vinyl alcohol) is not made commercially by the polymerization of vinyl alcohol because this compound is very unstable and immediately changes to its isomer, acetaldehyde. Instead, usually, the stable derivative of vinyl alcohol, vinyl acetate, is polymerized, and poly(vinyl alcohol) is produced therefrom by alkaline hydrolysis or alcoholysis. If the hydrolysis is incomplete, the result would be a polymer chain that, in theory at least, would represent the mixed polymerization of vinyl alcohol and vinyl acetate. As such, it can be, and herein is, termed a copolymer. Additionally, the copolymerization of vinyl acetate and one or more other monomers (for example, maleic anhydride and vinyl chloride) followed by hydrolysis to remove acetyl groups can produce a variety of (theoretical) copolymers of vinyl alcohol.

For simplicity, the abbreviation "PVA" is used hereafter to indicate either poly(vinyl alcohol) or (theoretical) copolymers of vinyl alcohol and other monomers in such proportions as to produce a product which is water soluble under the conditions obtaining in the practice of this invention. Conceivably, certain copolymers which are water soluble under alkaline conditions would not be sufficiently soluble under the neutral or slightly acidic conditions necessary to carry out the chemical reactions involved and hence should be excluded.

In order to avoid alternative phraseology, the term "adhesive" in its noun sense, is used herein to designate a product regardless of whether its use be as a laminating agent, a binding agent for a pigmented coating material, or as a stiffening or sizing material for leather, textiles or other comparable materials.

Many purposes today require that an adhesive shall be water soluble for purposes of application but, once dried, shall become substantially insoluble and resistant to softening on rewetting. The most widely used insolubilizing agent for poly(vinyl alcohol) adhesives is an aqueous solution of dimethylol urea or urea-formaldehyde resin which is simply mixed with the PVA solution. This treatment, however, gives results which are inferior to those obtained by the practice of this invention even if dimethylol urea is precooked with the PVA solution in the presence of a catalyst to facilitate reaction with the PVA. The formation of dimethylol urea requires a 2 to 1 molal ratio of formaldehyde to urea which is also ideal for complete resin formation, hence there is considerable preferential reaction between dimethylol urea or resin molecules to form high molecular weight urea-formaldehyde polymers rather than forming chemical combinations with the PVA molecules.

A mole of urea can react with up to 4 moles of formaldehyde to yield a variety of methylol ureas as follows:

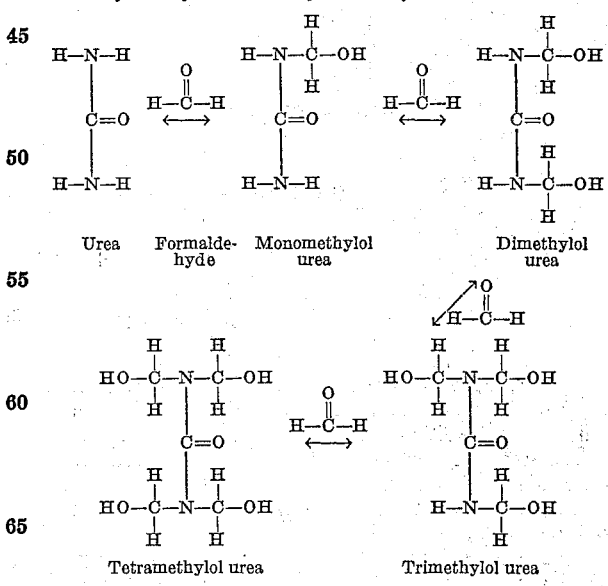

All of the above reactions are reversible and, at equilibrium, a large excess of formaldehyde is required to produce any of the tetramethylol urea. A solution containing a 5 to 1 ratio of formaldehyde to urea equilibrates with 2 parts of uncombined formaldehyde, the remaining combined formaldehyde being a mixture of mono-, di-, tri-, and tetramethylol urea.

The object is to obtain maximum combination of urea-formaldehyde molecules with PVA molecules, with minimum polymerization of the urea-formaldehyde molecules, since such polymerization is detrimental to the result desired.

Polymerization results under the influence of acid catalysts whereby water is split off between a methylol group and an amide hydrogen. Dimethylol urea presents the greatest opportunity for polymerization, since its methylol groups and amide hydrogens are present in equal numbers and the possibilities for combination are at a maximum. Trimethylol urea is less likely to polymerize of itself than dimethylol urea, while tetramethylol urea in all probability will not polymerize at all since there are no amide hydrogens left. Combination with PVA, however, is readily possible. The trimethylol and tetramethylol ureas can exist only in the presence of the above noted excess of formaldehyde.

PVA can become combined with the urea-formaldehyde resin molecules by two routes:

(1) A hydroxyl group of the PVA can combine with the hydroxyl of a methylol group on the resin and split out water, or (2) A hydroxyl group of the PVA can combine with free formaldehyde to form a methylol group attached to the PVA by an oxygen, and then the hydroxyl part of this methylol group can combine with an amide hydrogen of the resin and split out water. Typical examples using dimethylol urea to represent the resin are:

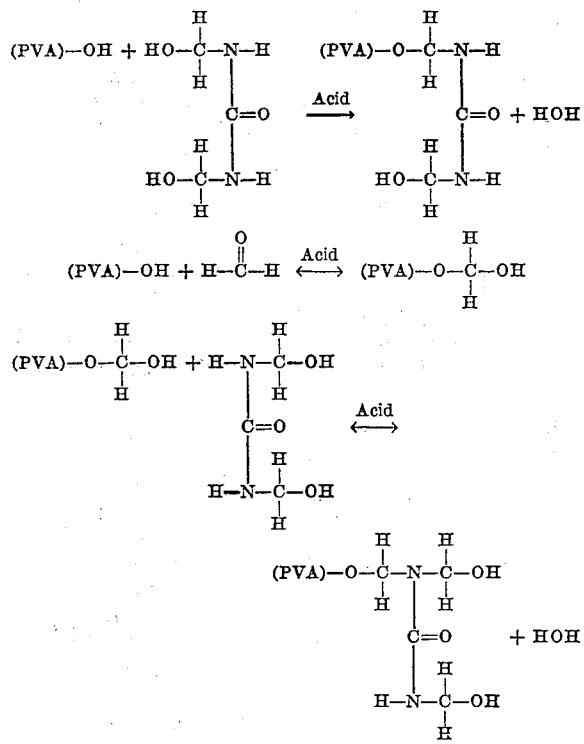

The present invention contemplates the direct addition of formaldehyde and urea to the PVA solution under mild acidic condition and with the formaldehyde greatly in excess of the urea in molal ratio. A preferred procedure in accordance with the invention (see Examples 2 and 3) comprises introducing into the aqueous solution of polyvinyl alcohol obtained by hydrolyzing polyvinyl acetate, i.e., substantially completed hydrolyzed polyvinyl acetate, an amount of formaldehyde and urea as will provide in the first stage of reaction a molar ratio of formaldehyde to urea varying from about 2.5:1 to about 5:1, said aqueous mixture providing mixed methylol ureas in admixture with the hydrolyzed polyvinyl acetate, adjusting the mixture to a pH between about 4 and 7 and cooking the mixture at a temperature of between about 150° F. and 205° F. for a period of time sufficient to cause the viscosity of the mixture to rise. After cooking the PVA-formaldehyde-urea mixture, sufficient urea is added to bring the formaldehyde to urea molal ratio to about 1.6:1 to about 2.5:1, preferably approximately 2.0. When cooled, a relatively stable, fluid adhesive solution is obtained, which can be cured to an insoluble film. The additional urea added during the second stage of the two stage process of the invention as exemplified in Examples 2 and 3 amounts to at least about 15% of the total weight of urea in the mixture which provides a resulting composition which is adapted to be readily cured by heating. If long pot life is desired, the solution can be neutralized or be made slightly alkaline.

The proper reaction time is a function of concentration, temperature and pH. During cooking, viscosity may at first fall as a result of the addition of bulking side groups. As the cooking is prolonged, the viscosity begins to rise as a result of cross-linking of PVA chains. This latter change affords an indication of when the optimum cooking effect has been obtained. The reaction should be inhibited by change of pH or temperature before the viscosity rise becomes great. If the intended end use renders a higher terminal viscosity permissible, it is better to start with a higher molecular weight PVA. Excessive reaction gives rise to a phlegm-like material and then a gel.

The following examples will serve to illustrate our invention:

*Example 1.*—A wash resistant size for textile application was prepared in the laboratory as follows:

| | Grams |
|---|---|
| Medium viscosity 77% hydrolyzed poly(vinyl acetate) (Elvanol 52-22) | 5 |
| Formaldehyde (37% solution) | 6.8 |
| Urea | 1.5 |
| Water | 40 |

This mixture was adjusted to pH 6.0 with dilute acetic acid and cooked at 195° F. for 30 minutes. Then 0.5 gram urea was added and the solution was diluted with water to 3% concentration. Ammonium metaphosphate, 0.5 gram, was added as a catalyst and the solution was used to treat an unsized muslin. After ten minutes on a steam heated drier drum at 225° F. the size was cured sufficiently to be retained after repeated washing.

*Example 2.*—The excellence of this adhesive makes possible clay coatings at extremely low binder levels with excellent wet rub and hiding power. When applied to unbleached papers, such coatings produce a great brightness increase even with very low coat weights. Adhesives tend to transparentize clay coatings. The dull base sheet shows through the bright coating less if it is possible to reduce the percent of adhesive. As an example, the adhesive portion of a coating was prepared from the following materials:

| | Grams |
|---|---|
| High viscosity poly(vinyl alcohol) (Elvanol 72-60) | 2 |
| Formaldehyde (37% solution) | 3.4 |
| Urea | 0.85 |
| Water | 50 |

The mix was adjusted to pH 6.0 with dilute acetic acid and cooked at 195° F. for 30 minutes. Then 0.4 gram urea was added and the adhesive solution was immediately dumped into a slurry of 100 grams of KCS coating clay dispersed in 193 grams of water to yield a 30% solids coating color suitable for application at the paper machine size press. Laboratory applications of this coating on kraft multiwall bag paper gave approximately double the brightness increase of conventional size press coating formulae at a given coat weight. The coating was resistant to wet rub after normal ageing or accelerated curing in the oven for 20 minutes at 220° F. It was superior in this respect to latex formulations.

*Example 3.*—Our adhesive can also be used at the paper machine calender stack to replace the starch size frequently used to improve the printing properties and scuff resistance on liner board. This replacement will perform the same function. Additionally, the board will have excellent wet scuff resistance. A laboratory size was prepared as follows:

| | Grams |
|---|---|
| High viscosity poly(vinyl alcohol), (Elvanol 72-60) | 2 |
| Formaldehyde-urea mixture, 4.6 to 1 molal ratio (U.F. Concentrate 85) 85% solution | 2.12 |
| Urea | 0.3 |
| Acid stable wax emulsion, 40% solids | .7 |
| Water | 70 |

The mix was adjusted to pH 6.0 with dilute acetic acid and cooked at 195° F. for 30 minutes. Then 0.4 gram urea was added and the solution cooled by diluting to 3% concentration. Ammonium metaphosphate, 0.25 gram, was added as a catalyst and the solution was applied to a dry finish board with a rubber squeegee as an experimental expedient. After normal ageing or accelerated oven curing for 20 minutes at 220° F. the west scuff resistance was increased many fold over that of the untreated board or a comparable board with a conventional starch treatment.

U.F. Concentrate 85 is a commercially available more convenient source of concentrated formaldehyde and urea. On receipt, it is virtually an equilibrium mixture of free formaldehyde and methylol ureas. In the practice of this invention, this mixture can be used to replace a chemically equivalent quantity of formaldehyde solution and urea with substantially identical results provided that the water volumes are adjusted to obtain the desired concentrations. Where formaldehyde and urea are mentioned in the claims, it should be understood that this refers equally to equilibrium mixtures thereof. As can be seen in Examples 2 and 3, the combined total weight of urea and formaldehyde are placed in about 5% excess of the weight of the hydrolyzed polyvinyl acetate in the first stage of cooking.

Caution must be exercised in the use of the above formulas because minor differences in the PVA can make a significant difference in the ease of its insolubilization. Although solution viscosity is the standard method of the industry for expressing degree of polymerization, there is no universal agreement on the details of its measurement. Accordingly, samples rated at a given viscosity will still vary in degree of polymerization from supplier to supplier. Additionally, in the case of copolymers with vinyl alcohol, the kind and relative proportions of the monomers used greatly influences results. An adequate number of hydroxyl groups per PVA chain must be present to give adequate chance for combination with the urea-formaldehyde resin. Alternatively, the larger the number of accessible hydroxyl groups per PVA chain, the more readily cross-linking occurs. Hence, with a PVA containing a larger number of accessible hydroxyl groups per chain, milder cooking conditions (less time, lower temperature, higher pH, greater initial ratio of formaldehyde to urea, less urea-formaldehyde, either singly or in combination) should be used to avoid excessive cross-linking before use.

Since certain changes in carrying out the above method, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A method of preparing a low viscosity polyvinyl alcohol-containing adhesive resistant to increase in viscosity on ageing and adapted to be cured in the presence of acid to a water-resistant condition comprising introducing into an aqueous solution containing hydrolyzed polyvinyl acetate an aqueous acid solution of urea and formaldehyde containing formaldehyde and urea in mol ratio of 2.5:1 to 5:1, there being present a combined weight of urea and formaldehyde which is about 5% in excess of the weight of the hydrolyzed polyvinyl acetate, said aqueous solution providing mixed methylol ureas, adjusting the mixture to a pH between about 4 to 7, cooking the mixture at a temperature between about 150° F. and 205° F. for a period of time sufficient to cause the viscosity of said mixture to rise, adding an amount of urea to said cooked solution to adjust the total mol ratio of formaldehyde to urea to from about 1.6:1 to about 2.5:1, said additional urea being at least 15% of the total weight of urea in said mixture, whereby there is obtained a low viscosity adhesive capable of curing in acid condition by heating.

2. A method as claimed in claim 1 wherein the pH of said mixture of aqueous mixture containing urea, formaldehyde and hydrolyzed polyvinyl acetate is adjusted to a pH of about 6 before cooking said mixture.

3. A method as claimed in claim 1 wherein said aqueous mixture containing urea, formaldehyde and hydrolyzed polyvinyl acetate is cooked for a period of one-half hour at a temperature of 195° C.

4. A method as claimed in claim 1 in which said hydrolyzed polyvinyl acetate is of high molecular weight and the viscosity of said aqueous mixture containing urea, formaldehyde and hydrolyzed polyvinyl acetate has a viscosity at the end of said cooking step which is higher than the viscosity at the beginning of said cooking step.

5. A polyvinyl alcohol-containing urea-formaldehyde adhesive prepared in accordance with the method defined in claim 1.

References Cited in the file of this patent

UNITED STATES PATENTS

| 2,414,208 | Murray | Jan. 14, 1947 |
| 2,481,676 | Lowe | Sept. 13, 1949 |
| 2,483,330 | Bartlett et al. | Sept. 27, 1949 |

FOREIGN PATENTS

| 361,910 | Great Britain | Nov. 16, 1931 |
| 133,356 | Australia | July 14, 1945 |